July 6, 1965 R. D. KEYS 3,192,766

MULTI-SPECIMEN TESTING APPARATUS

Filed Aug. 14, 1962 2 Sheets-Sheet 1

INVENTOR.
ROBERT D. KEYS
BY
Earl C. Hancock
AGENT

July 6, 1965  R. D. KEYS  3,192,766
MULTI-SPECIMEN TESTING APPARATUS
Filed Aug. 14, 1962  2 Sheets-Sheet 2

INVENTOR.
ROBERT D. KEYS
BY
Earl C. Hancock
AGENT

United States Patent Office 3,192,766
Patented July 6, 1965

3,192,766
MULTI-SPECIMEN TESTING APPARATUS
Robert D. Keys, Arapahoe County, Colo., assignor to Martin-Marietta Corporation, Baltimore, Md., a corporation of Maryland
Filed Aug. 14, 1962, Ser. No. 216,204
11 Claims. (Cl. 73—95)

This is a continuation in part of my co-pending application, Serial No. 135,504, filed September 1, 1961, entitled "Multi-Specimen Testing Apparatus," now abandoned.

This invention relates to devices for determining the tensile characteristics of various materials. More particularly, this invention relates to an apparatus for sequentially testing a plurality of test specimens to rupture failure to determine the tensile qualities of the materials used to fabricate the test specimens.

In designing structures, it is frequently necessary to know the tensile qualities of various materials in order that proper design parameters and/or material selections can be employed. Heretofore the tensile qualities of a given material have been determined in general by making a test specimen from the material, usually in elongated form, and then simply applying a uniaxial stretching force to the ends of the specimen until the specimen actually breaks. The reaction of the material is recorded by various instruments which sense such bits of information as the strain or stress at various points on the specimen, the amount of elongation or stretching and the magnitude of the stretching forces. Subsequently or by automatic means, the test data is correlated and compiled into various charts, tables, graphs and the like from which a designer can predict the tensile qualities of the material under anticipated conditions with reasonable accuracy and reliability.

Of course, many specimens must be tested before the data that is gathered can be said to be accurate. Thus it has been the practice to fabricate a multiplicity of specimens and to load the specimens one by one into a machine that will stretch them to failure. That is to say, the machine is set up with each specimen individually and must be cleared of the previously tested specimen before another specimen can be tested. In the past this practice has been generally quite satisfactory since the temperature and environment of the specimen usually did not vary enough between tests to cause any significant inaccuracies in the data produced and little attention was directed to the time lapse experienced in setting up the machine for testing each specimen individually. Also the environment of the material when it is actually used generally was substantially the same as the test environment.

However, the increased industrial use of supercooled or cryogenic materials has made it necessary to predict with reasonable accuracy just what the tensile qualities are of the materials that must be associated with the cryogenic temperatures. Unfortunately, it is known that most materials do not exhibit the same behavior at supercool temperatures as they do at ambient temperatures. Furthermore, in most cases data obtained at ambient temperatures cannot be accurately or reliably extrapolated to the supercooled temperatures. In fact, differences in behavior of structural or non-structural materials can be significant for seemingly insignificant temperature variations when cryogenic applications are involved. As a result, it is necessary to test the candidate material while it is in a supercooled environment in order to predict its mechanical properties such as tensile strength, modulus, ductility and weld strength. As mentioned herein, ambient temperatures means those temperatures normally experienced in past tensile testing and generally involved temperature ranges at or near standard room temperature.

Resort to the aforementioned established tensile testing procedure in a cryogenic atmosphere is undesirable for several reasons. First, the test chamber must generally be brought back to room temperature before a previously tested specimen can be moved and replaced with a new specimen. Since cryogenic temperatures are extremely low, liquid hydrogen being at −423° F. for instance, it can be appreciated that this raising and lowering of the test chamber temperature is quite inefficient both in time consumption and in heat loss which results in wasting of the cryogenic medium. Further, the maintenance of a consistent test environment is difficult due to the constant raising and lowering of the test chamber temperature and the increased possibility of impurities being introduced thereby casting some doubt upon the test results. In addition, the use of some cryogenic materials such as liquid oxygen and especially liquid hydrogen involves a considerable safety hazard for personnel carrying out the tests.

Accordingly, the present invention provides an apparatus for individually and sequentially testing a plurality of test specimens to determine the tensile qualities of each of the specimens. By use of the present invention, tensile testing of a plurality of test specimens can be performed wherein each specimen is rupture tested individually without requiring that the test assembly be disassembled and reassembled until all of the specimens have been tested.

In particular, the present invention provides an apparatus for handling a multiplicity of test specimens so that one of the specimens will be aligned with an applied uniaxial tensile or stretching force until failure whereupon another specimen will be rotated into alignment with the direction of the applied tensile force. The test specimens are held so that they will sequentially advance towards the location or orientation where the tensile forces are applied. The test specimens will each remain unloaded until it actually reaches the force applying location.

More particularly, the present invention contemplates an apparatus wherein a plurality of test specimens, usually elongated in configuration, are commonly and rotatably mounted at one end thereof and are interconnected in a series relation at the other end by a combination of links and pins. A separating force is applied between one of the pins and the common connection to fail the test specimen retained therebetween. Thereupon the link interconnecting the failed specimen and the next specimen will be rotated and repositioned to align both itself and the specimen associated therewith with the axis of the applied stretching forces. The links and pins are so arranged that they are actually interrelated much like a chain and, in a preferred embodiment, hold the unloaded test specimens in a generally fan-shaped orientation.

Any of a wide variety of means or steps could be employed for applying the stretching or tensile forces to the specimen under test in accordance with this invention. In addition, the mounting arrangements used can be modified to provide an automatic alignment or twist relieving feature as will be explained more fully hereinafter. The present invention can be utilized whenever a multiplicity of test specimens are to be rupture tested, but the invention is particularly useful when a multiplicity of test specimens must be tested in an atmosphere that is difficult or hazardous to obtain and/or maintain.

Therefore, this invention is especially useful for determining the tensile qualities of materials while under the influence of supercool (cryogenic), hot, or toxic environments.

The novel features that are considered characteristic of this invention are set forth with particularity in the appended claims. The invention, however, both as to its organization and preferred mode of operation as well as additional features and advantages thereof will be best understood from the following description when read in connection with the accompanying drawings in which:

Figure 1:
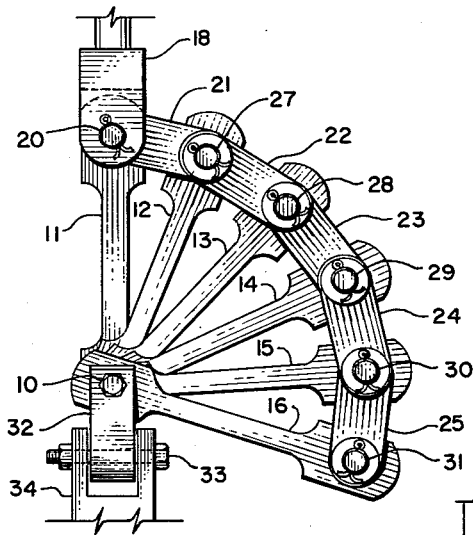
FIGURE 1 illustrates the arrangement of a preferred embodiment of this invention.

FIGURE 1 reveals an arrangement in accordance with this invention for sequentially testing a plurality of test specimens 11 to 16 which each have one end thereof commonly and rotatably mounted on pin 10. The test specimens as shown in FIGURE 1 are elongated in configuration and have a generally necked-down center portion, but the invention is not limited to this configuration nor to the particular number of specimens shown, of course. The advantage of the necked-down configuration is that the center portion will rupture fail before the ends so that the tensile qualities of the material are actually being measured and not the tensile qualities of the joint. Specimens 11–16 are constructed of the material or materials for which tensile quality data is to be obtained. The type of material used as well as the length and/or cross-section can be varied from specimen to specimen depending upon the data to be obtained.

The first test specimen 11 is rotatably retained in U-shaped member 18 by means of pin 20. A link 21 is also retained in member 18 by pin 20 as is another link located on the other side of specimen 11 but hidden by link 21. The other end of link 21 is rotatably retained to specimen 12 by pin 27 as is the aforementioned hidden link on the other side of specimens 11 and 12. Specimens 13 to 16 are rotatably and successively interconnected with each other and with specimen 12 by means of links 22 to 25 and pins 28 to 31. It is to be understood that there are also counterparts to links 22 to 25 on the hidden side of specimens 12 to 16 and that the hidden links are rotatably mounted on pins 27 to 31.

Links 21 to 25 are shown as being retained on pins 27 to 31 by a washer and cotter pin arrangement but any suitable fastening or retaining means could be employed.

Common retaining pin 10 is mounted in another U-shaped member 32 which in turn is mounted in yet another U-shaped member 34 by shoulder bolt 33. Specimen 11 is placed in tension by pulling upwards on member 18 and holding member 34 in a fixed position. It should be appreciated that specimen 11 could be also placed in tension by holding member 18 in a fixed position and pulling downwards on member 34 or by simultaneously pulling members 34 and 18 apart.

In any event, specimen 11 will be placed under tension and stretched until it breaks. At that point, member 18 will move upwards slightly causing link 21 to rotate about pins 20 and 27 so that specimen 12 will become axially aligned with members 18 and 34. After specimen 11 has broken, the applied stretching force is generally quickly removed to prevent shock loading of the other specimens unless, of course, shock-loading is a desired feature.

Figure 2:
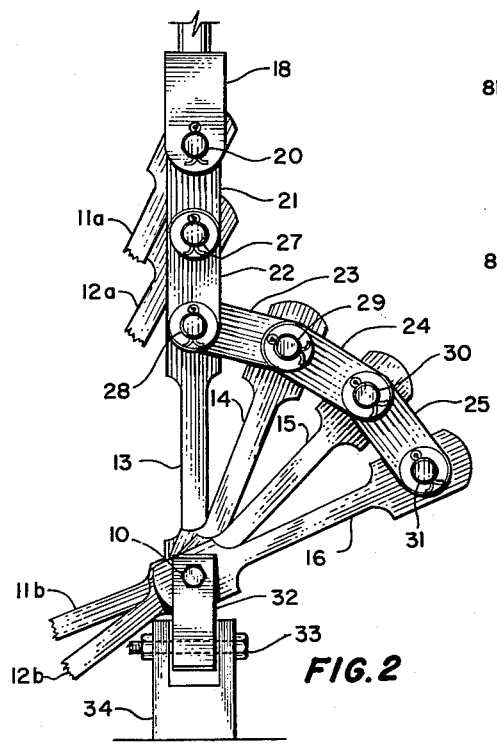
FIGURE 2 shows the interrelation of the components of an embodiment similar to FIGURE 1 after two of the specimens have been rupture failure tested.

FIGURE 2 shows the structure of FIGURE 1 after the first two of the specimens have been rupture failed. More particularly, specimens 11 and 12 of FIGURE 1 are shown in FIGURE 2 after they have been broken by the applied tensile forces into ends 11a and 11b, and 12a and 12b respectively. FIGURE 2 shows clearly how links 21 and 22 have repositioned so as to axially align themselves with the direction of the tensile force applied between members 18 and 34. The repositioning of links 21 and 22 has allowed member 18 to move upwards in the direction of the applied force and also has allowed specimen 13 to rotate about pin 10 so as to be in position for stretch testing.

It can be seen that the ends 11a, 11b, 12a and 12b have fallen or been forced aside so as not to interfere with the subsequent testing of specimens 13 to 16. It should also be noted that the chain arrangement created by links 21 to 25, the hidden counterparts of these links and pins 20 and 27 to 31 have caused specimens 14 to 16 to rotate about pin 10 towards the test location or orientation although specimens 14 to 16 are still unloaded and do not in any way interfere with the tests of the preceding specimens. Obviously it would be possible to rotate the direction of the applied force instead of rotating the specimens if this should be desired.

Figure 3:
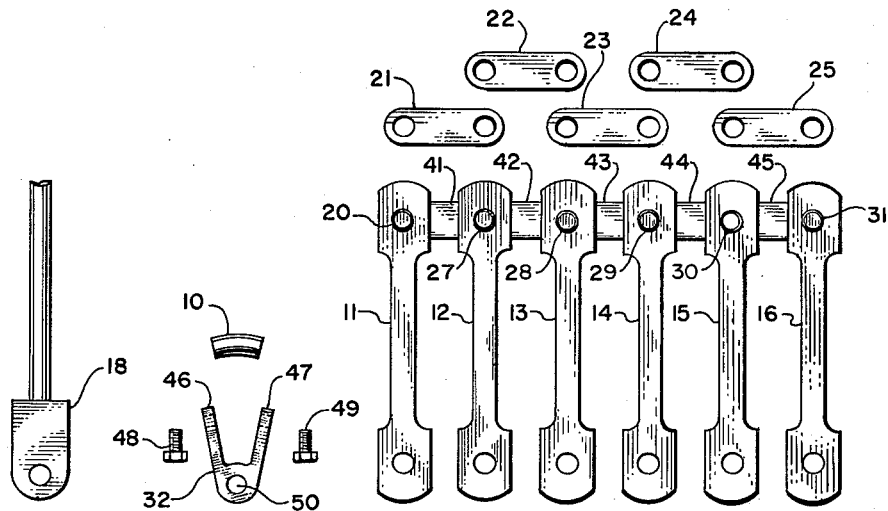
FIGURE 3 is a generally exploded view of the components of FIGURE 1.

FIGURE 3 is an exploded view revealing the general interrelation of the components of an apparatus similar to that shown in FIGURE 1. In addition, FIGURE 3 shows some of the features advantageously incorporated in an apparatus actually successfully employed for testing a plurality of specimens in liquid hydrogen. Links 41 to 45 are the links referred to in FIGURE 1 as being hidden on the far side of test specimens 11 to 16 and are the counterparts of links 21 to 25. Thus it can be seen that links 21 to 25 and 41 to 45 after being rotatably interconnected by pins 20 and 27 to 31 form a chainlike arrangement much like a bicycle chain. Although the invention is not limited to the particular chain arrangement as shown, the advantage of this arrangement is that the specimens could rupture fail at the pin connections and not affect the ability of the device to test subsequent specimens.

In the structure actually built and successfully operated, mounting pin 10 which commonly retains the lower ends of specimens 11 to 16 was made with a slight curvature as shown in FIGURE 3. Pin 10 was then retained between arms 46 and 47 of U-shaped member 32 by means of bolts 48 and 49. U-shaped member 32 was then pivotally mounted on a pin passed through hole 50, this pin being shown as shoulder bolt 33 in FIGURE 1. By this arrangement, the test specimen actually being stretched was allowed to axially align itself with the tensile force applied to member 18 so that no twisting forces or couples are created by the test. That is to say, the test specimen is mounted so as to allow rotation thereof in its own plane about pin 10 while allowing rotation of the specimen in a plane perpendicular to its own plane about the pin mounting in hole 50. Thus each test specimen is gimbal mounted at one end.

In addition, the curvature of pin 10 allows the contacting surfaces between pin 10 and the lower mounting hole in each specimen to be maintained substantially normal during the testing operation. This reduces any undesirable twisting forces or couples which might be established due to any uneven force distribution across the contacting surface between the specimen and pin 10.

Figure 4:
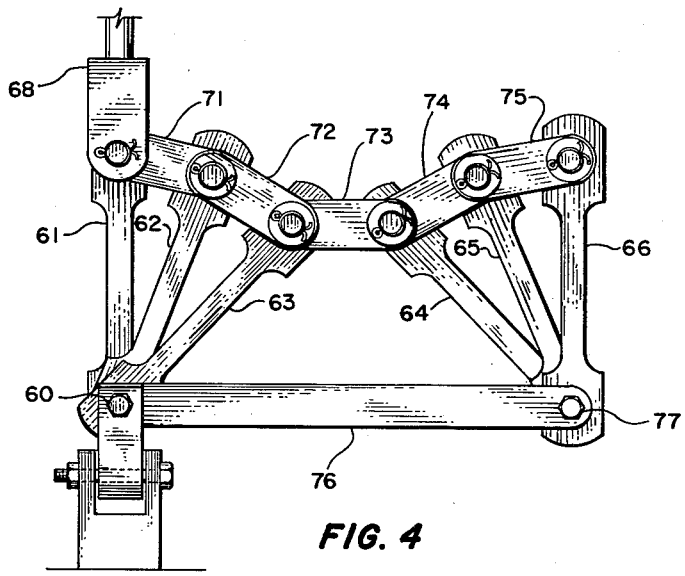
FIGURE 4 illustrates an example of another embodiment constructed in accordance with the present invention.

In the light of the present invention, many modifications and arrangements will be readily apparent to one having normal skill in the art, and FIGURE 4 illustrates one such possible modification.

In FIGURE 4, test specimens 61, 62 and 63 are mounted on pin 60 on one end thereof and interconnected with U-shaped member 68 by means of links 71 and 72 in an arrangement substantially the same as that shown in FIGURE 1. In addition, specimens 64, 65 and 66 have one end thereof commonly and rotatably mounted on bar 76 by pin 77. The other ends of specimens 64, 65 and 66 are interconnected with each other by links 74 and 75 and may be seen to be attached to U-shaped member 68 through the inter-connected links 71, 72 and 73. Thus links 71 to 75 form the same general chain arrangement as was described for FIGURES 1, 2 and 3. Bar 76 in turn is rotatably mounted on pin 60.

By the arrangement of FIGURE 4, two complete sets of test specimens could be mounted to increase the number of specimens that can be tested in one sequence. Although only six specimens are shown for FIGURE 4, it should be understood that a much greater number could be mounted on pins 60 and 77. Bar 76 could be a single bar or could have a counterpart mounted on the other side of the specimens. Further, specimens 64, 65 and 66 could be connected to bar 76 by a gimbal arrangement similar to that shown and described in FIGURES 1, 2 and 3.

In the aforementioned actual tests successfully performed in accordance with this invention, the stretching force was supplied by a Baldwin-Lima-Hamilton Model FGT 50,000 pound test machine. The console of this machine included an SRA7 autographic recorder to plot load versus strain curves. Liquid hydrogen was being utilized for environment control in one series of tests and accordingly mechanisms were set up to purge the entire test chamber of air by means of helium. An arrangement similar to that shown in FIGURE 1 was used and U-member 34 was rigidly attached to the floor of the test chamber. The tension rod for the upper yoke (member 18) was isolated from the exterior of the test chamber by a convoluted rubber flex tube which allowed approximately 10 inches of stroke without significant frictional losses.

Each specimen had a resistance strain gage attached thereto and since six test specimens were in fact tested, almost six times as much testing in a given period of time was realized as compared to the one-at-a-time technique. The outputs from the strain gages were utilized in a straight-forward and well-known bridge circuit arrangement. The connecting links were designed with approximately two inches between mounting centers. The links, mounting pins and yoke assemblies were made of type 321 stainless steel while the common pin 10 was made of A-286 stainless steel precipitation hardened to over 125,000 p.s.i. which was then strain hardened on the surface. Tolerances were kept close to prevent misalignment but were generous enough to facilitate assembly and disassembly while the parts were cold or frosty. Binding was found to be no problem at the cryogenic temperature.

The success that can be realized by advantageously utilizing the present invention is demonstrated by the close agreement of test results. For instance, ten tests were performed on 6061-T6 aluminum alloy at −423° F. Maximum ultimate tensile strength was found to be 73,000 p.s.i. while the minimum was 71,600 p.s.i. the average being 72,600 p.s.i.

Figure 5:
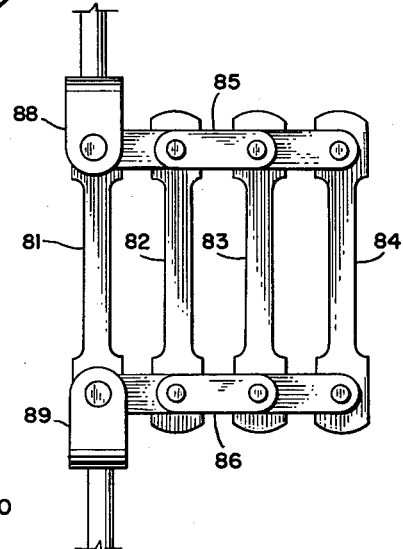
FIGURE 5 illustrates still another embodiment constructed in accordance with the present invention.

FIGURE 5 illustrates yet another possible embodiment that could be constructed and utilized in accordance with the present invention. The arrangement shown in FIGURE 5 is designed to handle four test specimens 81 to 84 which are rotatably interconnected in a ladder arrangement by a pair of linkage systems indicated generally at 85 and 86. It is to be understood that linkages 85 and 86 are constructed so as to operate substantially the same as the chain linkages described hereinbefore for FIGURES 1-4.

In the FIGURE 5 embodiment, the ends of test specimen 81 and the ends of linkages 85 and 86 are rotatably pin mounted between a pair of U-shaped members 88 and 89. By applying a separating force to members 88 and 89, specimen 81 can be tested to rupture failure. Then members 88 and 89 can be moved slightly apart so as to axially align the first sections of linkages 85 and 86 with the direction that the failure testing forces are applied. By so doing, of course, specimen 82 will then be positioned for the next failure test. The failure and re-alignment procedure can then be sequentially performed until all of the specimens are tested.

It should be appreciated that either of U-shaped members 88 and 89 could be fixed or alternatively both members could be free to move. It should also be appreciated that the embodiment of FIGURE 5 has the advantage that gimbaling is not necessary for either members 88 or member 89 although twice as much travel of the linkages must be accommodated during testing with a FIGURE 5 type arrangement as compared to that of FIGURE 1.

Although the foregoing exemplary embodiments and processes have been described with particularity, the present invention is not intended to be limited to the particular structures shown or steps described. For instance, the specimens could be made with shoulders on each end as an integral part thereof instead of using separate mounting pins. In addition, the gimbal mounting for the common mounting pin could be realized by a simple ball and socket arrangement. The arrangements shown in the drawings could also be modified by placing blocks on the mounting pins of the chain and then threading the specimens into the blocks.

It is to be understood, of course, that the testing structure that is actually axially aligned with the applied tensile or stretching forces must be designed to withstand greater tensile loading than the particular specimen being tested. For instance, referring to FIGURE 2, members 18, 32 and 34, pins 20, 27, 28, 10 and 33, and links 21 and 22 must be designed to withstand greater loading in tension than specimen 13. This is most advantageously accomplished by reducing the test section of the test specimens so that some portion thereof has a relatively small cross-sectional area.

Many other variations within the spirit of this invention will be readily apparent to those having normal skill in the art.

What I claim is:

1. An apparatus for sustained tensile failure testing of at least two elongated test specimens having first and second end portions comprising: a mounting pin for rotatably and commonly retaining said first end of each of said test specimens, at least one link connection rotatably coupled to said second end of at least two of said test specimens in a manner separating said second ends in a spaced relationship, and means for applying forces between one end of said link connection and said mounting pin for sequentially tensile stressing said test specimens to rupture failure.

2. An apparatus for sustained tensile failure testing of a plurality of elongated test specimens comprising: a mounting pin for rotatably and commonly retaining one end of each of said test specimens, a plurality of coupling means, a plurality of link connections each having one end thereof rotatably connected to a respective one of said coupling means, the other ends of said link connections being sequentially and rotatably connected to a respective said coupling means in a chain arrangement, the other ends of said test specimens being rotatably connected to a respective said coupling means, and means for applying tensile forces between said mounting pin and one of said coupling means for tensile stressing to rupture failure the said test specimen mounted therebetween, whereby after the said test specimen failure, the said link connection associated with the said one of said coupling means will axially align with the applied tensile forces thereby aligning the next connected said test specimen for tensile testing.

3. An apparatus in accordance with claim 2 which includes means for pivotally retaining said mounting pin to permit sequential axial alignment of said test specimens with the applied tensile forces.

4. An apparatus for sustained tensile failure testing of a plurality of elongated test specimens comprising: a retaining pin having one end of each of said test specimens rotatably mounted thereon, a plurality of mounting pins each rotatably mounted in the other end of a respective said test specimens, first and second pluralities of links rotatably connected in series relation on opposite sides of said other end of said test specimens by said plurality of mounting pins, and means for producing separating forces between said retaining pin and one of said mounting pins to rupture fail the said test specimen mounted therebetween, whereby after said rupture failure, the said links associated with the failed said test specimen will rotate to axially align with the direction of the separating force thereby aligning another said test specimen with the direction of said separating forces.

5. An apparatus in accordance with claim 4 which includes means for pivotally mounting said retaining pin for accommodating the sequential alignment of said test specimens with the direction of the separating forces.

6. An apparatus in accordance with claim 4 in which said retaining pin is curved for maintaining a substantially even force distribution across the contact surface between said retaining pin and said one end of said test specimens, and which includes a U-shaped member having said retaining pin mounted between the arms thereof, and coupling means for mounting the base of said U-shaped member to allow shifting of said retaining pin to accommodate sequential axial alignment of said test specimens with the direction of the applied separating forces.

7. An apparatus in accordance with claim 6 in which said coupling means is a ball and socket joint.

8. An apparatus for tensile failure testing of a plurality of elongated test specimens comprising: first and second pluralities of link connections, first and second pluralities of mounting pins, one end of each of said first link connections being rotatably connected to a respective said first mounting pins, the other end of each of said first link connections being sequentially and rotatably connected to a respective other of said first mounting pins thereby providing a first chain arrangement, one end of each of said second link connections being rotatably connected to a respective said second mounting pins the other end of each of said second link connections being sequentially and rotatably connected to a respective other of said second mounting pins thereby providing a second chain ararngement, said test specimens being rotatably mounted between successive ones of said first and second mounting pins in a ladder arrangement, and means for applying tensile forces to at least one of said test specimens for failure testing thereof.

9. An apparatus for sustained tensile failure testing of a plurality of elongated test specimens comprising a first tensioning means; a plurality of link members respectively rotatably connected to and interconnecting one end of said specimens, one of said link means being connected to said first tensioning means; connecting means rotatably interconnecting the other end of said specimens; and second tensioning means connected to said connecting means adapted to cooperate with said first tensioning means to apply a rupturing force between the ends of said specimens in a sequentially selective fashion.

10. An apparatus for sustained tensile failure testing of a plurality of elongated test specimens in accordance with claim 9, wherein said one end of said specimens are maintained in spaced relation by said links prior to rupture.

11. An apparatus in accordance with claim 9 in which said connecting means includes a gimbal mounting in connection with at least one of said test specimens.

References Cited by the Examiner

UNITED STATES PATENTS

| | | | |
|---|---|---|---|
| 2,467,129 | 4/49 | Huber | 73—15.6 |
| 2,878,007 | 3/59 | Corbett et al. | 73—15.6 XR |

RICHARD C. QUEISSER, *Primary Examiner.*

JOSEPH P. STRIZAK, *Examiner.*